A. F. Marston.
Domestic Boiler.
Nº 81,658.        Patented Sep. 1, 1868.
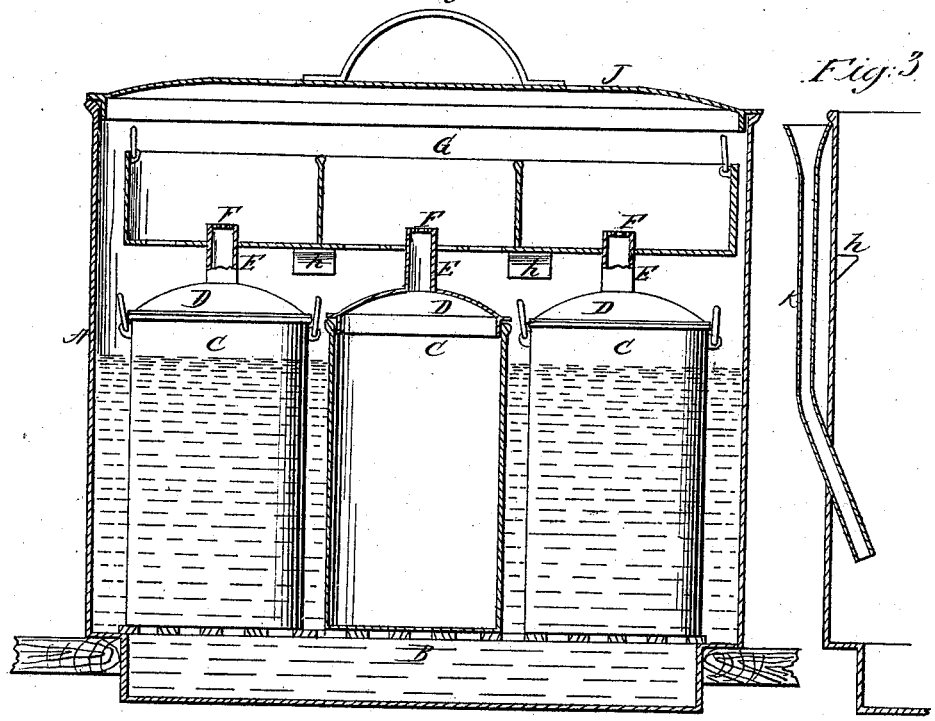
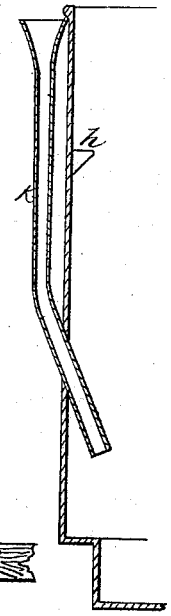
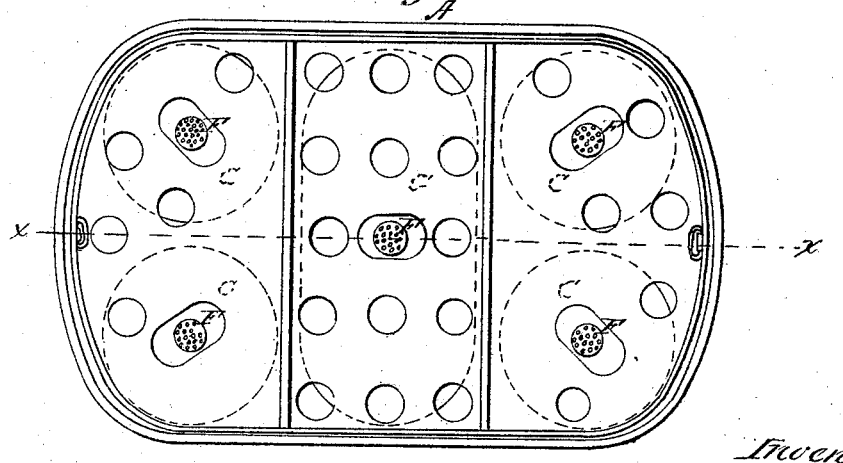
Witnesses
Wm A Morgan
G. C. Cotton
Inventor
Mrs. A. F. Marston
per Munn & Co
Attorneys

United States Patent Office.

A. F. MARSTON, OF CLINTON, LOUISIANA.

Letters Patent No. 81,658, dated September 1, 1868.

---

IMPROVEMENT IN CULINARY VESSELS.

---

The Schedule referred to in these Letters Patent and making part of the same.

---

TO ALL WHOM IT MAY CONCERN:

Be it known that I, Mrs. A. F. MARSTON, of Clinton, in the parish of East Feliciana, and State of Louisiana, have invented a new and improved Cooking-Apparatus; and I do hereby declare that the following is a full, clear, and exact description thereof, which will enable those skilled in the art to make and use the same, reference being had to the accompanying drawings, forming part of this specification.

The object of this invention is to construct an apparatus by which different kinds of food may be cooked or boiled or steamed in one general boiler, and be kept separate from each other, so that each shall retain its own flavor only.

And the invention consists in forming a number of separate vessels, with tubes attached to their covers, and arranging them in a large vessel; and also, in combination therewith, a vessel with a perforated bottom, for steaming vegetables or for other purposes, as will be hereinafter described.

Figure 1 is a vertical section of my improved cooking-apparatus, showing the vessels as they are arranged in the large boiler, the section being through $x \, x$ of fig. 2.

Figure 2 is a top view of the same with the cover off.

Figure 3 is a side view, showing the situation of the pipe for introducing water into the large vessel.

Similar letters of reference indicate corresponding parts.

A is the large boiler, which is in the form of the ordinary cooking-stove boiler, but which may be of any desired form and size.

B is a grated false bottom, upon which the interior vessels C rest.

The vessels C are closed by tight-fitting covers D, each cover having a tube, E, with perforated caps F.

G is a steamer, which is divided into two or more compartments.

Its bottom is perforated, and it rests on brackets $h$, which are attached to the sides of the main vessel, A.

J is the cover to the boiler A.

This cover is perforated with holes sufficient to allow the steam or vapor to escape.

The perforations F allow the vapor from the small vessels to escape.

As many of these small vessels may be used as may be desired or convenient, and they may be of any shape and size, so that they correspond with the main boiler as to the space they occupy.

K is the feed-pipe, through which water is introduced into the boiler A.

By this arrangement, meats and vegetables of different kinds, as well as pudding, may be cooked separately, and so that the flavors will not mingle with each other, thus saving much time and trouble in preparing them for the table.

I claim as new, and desire to secure by Letters Patent—

The arrangement, within the vessel A, upon the perforated bottom B thereof, of the vessels C, whose covers D are formed with tubes E, having perforated upper ends, whereby a communication is formed between the said vessels and the removable steamer G, supported upon internal lugs $h$, said steamer having partitions and a perforated bottom, all as herein shown and described for the purpose set forth.

The above specification of my invention signed by me, this 23d day of May, 1868.

A. F. MARSTON.

Witnesses:
J. J. COVERT,
BAILIE P. LEWIS.